(12) United States Patent
Atkins et al.

(10) Patent No.: US 7,255,438 B2
(45) Date of Patent: Aug. 14, 2007

(54) PAD TRANSFER PRINTING METHOD FOR MAKING COLORED CONTACT LENSES

(75) Inventors: Barry L. Atkins, Chicago, IL (US); Norbert Doerr, Griesheim (DE); Alfred Fischer, Niedernberg (DE); Michael Hugh Quinn, Suwanee, GA (US); Roland Schmieder, Aschaffenburg (DE); Robert Carey Tucker, Suwanee, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/226,604

(22) Filed: Sep. 14, 2005

(65) Prior Publication Data
US 2006/0077341 A1 Apr. 13, 2006

Related U.S. Application Data

(60) Provisional application No. 60/614,691, filed on Sep. 30, 2004.

(51) Int. Cl.
G02C 7/02 (2006.01)
G02C 7/04 (2006.01)

(52) U.S. Cl. .................... 351/177; 351/162

(58) Field of Classification Search ............... 351/162, 351/177
See application file for complete search history.

(56) References Cited

U.S. PATENT DOCUMENTS

| | | | |
|---|---|---|---|
| 3,476,499 A | 11/1969 | Wichterle | 8/4 |
| 3,536,386 A | 10/1970 | Spivak | 351/160 |
| 3,679,504 A | 7/1972 | Wichterle | 156/62 |
| 3,712,718 A | 1/1973 | LeGrand et al. | 351/160 |
| 4,405,773 A | 9/1983 | Loshack et al. | 526/317 |
| 4,460,523 A | 7/1984 | Neefe | 264/1.9 |
| 4,468,229 A | 8/1984 | Su | 8/507 |
| 4,472,327 A | 9/1984 | Neefe | 264/1.9 |

(Continued)

FOREIGN PATENT DOCUMENTS

EP 0 352 134 3/1994

(Continued)

OTHER PUBLICATIONS

European Standard Search Report, RS 111902 CH, Apr. 22, 2005.

(Continued)

Primary Examiner—Jordan M. Schwartz
(74) Attorney, Agent, or Firm—Jian Zhou

(57) ABSTRACT

A method comprises the steps of (a) providing a water based ink in at least one cliché with a contact lens pattern; (b) transferring the water based ink from the cliché to at least a surface of at least a contact lens forming mold by means of at least a transfer pad; (c) at least partially curing the ink transferred on the mold to form a colored film; (d) dispensing a hydrogel lens-forming material into a lens-forming cavity of the mold; and (e) curing the lens-forming material within the lens-forming cavity to form the contact lens, whereby the colored film detaches from the molding surface and becomes integral with the body of the contact lens; characterized in that the relative air humidity in the immediate vicinities of the transfer pad/s is kept higher than 50% at standard temperature and pressure conditions during ink transfer.

19 Claims, 4 Drawing Sheets

U.S. PATENT DOCUMENTS

| | | | |
|---|---|---|---|
| 4,582,402 A | 4/1986 | Knapp | 351/162 |
| 4,634,449 A | 1/1987 | Jenkins | 8/507 |
| 4,639,105 A | 1/1987 | Neefe | 351/162 |
| 4,668,240 A | 5/1987 | Loshack | 8/507 |
| 4,704,017 A | 11/1987 | Knapp | 351/177 |
| 4,719,657 A | 1/1988 | Bawa | 8/453 |
| 4,744,647 A | 5/1988 | Meshel et al. | 351/177 |
| 4,857,072 A | 8/1989 | Narducy et al. | 8/507 |
| 4,954,132 A | 9/1990 | Hung et al. | 8/507 |
| 4,963,159 A | 10/1990 | Narducy et al. | 8/507 |
| 5,034,166 A | 7/1991 | Rawlings et al. | 264/1.7 |
| 5,116,112 A | 5/1992 | Rawlings | 351/162 |
| 5,120,121 A | 6/1992 | Rawlings et al. | 351/162 |
| 5,272,010 A | 12/1993 | Quinn | 428/411.1 |
| 5,414,477 A | 5/1995 | Jahnke | 351/162 |
| 5,452,658 A | 9/1995 | Shell | 101/401.1 |
| 5,637,265 A | 6/1997 | Misciagno et al. | 264/1.7 |
| 5,793,466 A | 8/1998 | Moncada | 351/162 |
| 5,936,705 A | 8/1999 | Ocampo et al. | 351/162 |
| 6,030,078 A | 2/2000 | Ocampo | 351/162 |
| 6,132,043 A | 10/2000 | Atkins et al. | 351/162 |
| 6,164,777 A | 12/2000 | Li et al. | 351/162 |
| 6,284,161 B1 | 9/2001 | Thakrar et al. | 264/1.7 |
| 6,315,410 B1 | 11/2001 | Doshi | 351/162 |
| 6,337,040 B1 | 1/2002 | Thakrar et al. | 264/1.7 |
| 6,359,024 B2 | 3/2002 | Lai | 522/64 |
| 6,465,538 B2 | 10/2002 | Lai | 522/64 |
| 6,523,953 B2 | 2/2003 | Jahnke | 351/162 |
| 2001/0050753 A1 | 12/2001 | Tucker | 351/177 |
| 2003/0054109 A1 | 3/2003 | Quinn et al. | 427/385.5 |
| 2003/0119943 A1 | 6/2003 | Tucker et al. | 523/160 |
| 2003/0165015 A1 | 9/2003 | Jahnke | 359/581 |
| 2004/0044099 A1 | 3/2004 | Tucker et al. | 523/160 |
| 2004/0125338 A1* | 7/2004 | Phelan et al. | 351/160 R |
| 2004/0130676 A1* | 7/2004 | Doshi et al. | 351/162 |

FOREIGN PATENT DOCUMENTS

| | | |
|---|---|---|
| WO | WO 03/068416 | 8/2003 |
| WO | WO 2004/022659 | 3/2004 |

OTHER PUBLICATIONS

PCT International Search Report with Written Opinion, PCT/EP2005/010538, Dec. 21, 2005.

\* cited by examiner

PAD TRANSFER PRINTING METHOD FOR MAKING COLORED CONTACT LENSES

This application claims the benefit under USC § 119 (e) of U.S. provisional application No. 60/614,691 filed Sep. 30, 2004, incorporated by reference in its entirety. Concurrently filed U.S. patent application Ser. No. 11/226,725 is also incorporated herein by reference in its entirety.

The present invention generally relates to a method for making colored contact lenses. More specifically, the present invention relates to a pad transfer printing method for making colored hydrogel contact lenses with good image quality.

BACKGROUND

Contact lenses having one or more colorants dispersed in the lens or printed on the lens are in high demand. These colored contact lenses may enhance the natural beauty of the eye, or provide unique patterns on the iris of the wearer, or provide non-cosmetic patterns or marks, such as rotation marks, inversion marks, product/brand codes, lot numbers, "DEMO" lenses, and the like, which are of benefits to wearers, eye-care practitioners and manufacturers.

A known method of printing inks onto contact lens involves ink transfer printing. According to this method the colored film to be transferred to the lens is first deposited on a surface of the mold wherein the lens is subsequently formed. The pattern of the liquid colored film can be provided by etching or lasering a metal or ceramic plate. The etched pattern is then filled with an appropriate ink, leveled out with a suitable doctoring device, and a soft silicone rubber transfer stamp or pad impressed thereupon to transfer the pattern on the pad's surface. The pad containing the image is then brought to the lens forming mold and depressed in the correct place to transfer the pattern thus creating the colored film. The colored film may then be subjected to a partial or full cure. Thereafter, lens forming material is added to the mold and actinically or thermally cured to form the contact lens whereby the colored film detaches from the molding surface and becomes integral with the body of the contact lens.

Several organic solvent based inks have been used for ink transfer printing techniques of color images on a contact lens. In fact, due to the increased demand of colored contact lenses which requires mass production of the same, it is desirable to use an ink which is soluble in water. The use of a water based ink allows simplifying the automated production of colored contact lenses, resulting in more environmentally friendly and inexpensive products.

When employing a water based ink for ink transfer printing of color images on a contact lens the degree of ink transfer as well as smearing and delamination of the same is found to depend on several factors. Among them, the time required to transfer the ink from the cliché to the mold; the contact lens material, and the ink formulation.

In particular, it has been observed that the longer time a water based ink is kept hanging on a pad after picking up the ink from the cliché and before depositing it on the mold results in a degraded image quality. This has been attributed to the drying of the ink on the pad. Even for very short hanging time (1 to 5 seconds) the ink does begin to dry and eventually a long enough delay causes the ink to dry completely on the pad and eliminate the ink transfer or severely degrades the image when it is transferred to the mold.

In addition when the contact lens forming material is a water based monomer the mechanical strength of the lenses is surprisingly found to be strictly correlated with the water content in the ink and in the air.

Therefore there is a need to develop a water based ink transfer printing method for making colored contact lenses with improved image quality without compromising the lenses quality.

SUMMARY OF THE INVENTION

The invention provides a pad transfer-printing method for making a colored hydrogel contact lens, comprising the steps of:
  (a) providing a water based ink in at least one cliché wherein a pattern to be printed on the contact lens has been created;
  (b) transferring the water based ink from the cliché to at least one surface of at least one contact lens forming mold by means of at least one transfer pad;
  (c) at least partially curing the ink transferred on the mold to form a colored film;
  (d) dispensing a hydrogel lens-forming material into at least a lens-forming cavity of the mold; and
  (e) curing the lens-forming material within the lens-forming cavity to form the contact lens, whereby the colored film detaches from the molding surface and becomes integral with the body of the contact lens;

characterized in that the relative air humidity in the immediate vicinities of the transfer pad/s is kept higher than 50% at standard pressure and temperature conditions during ink transfer.

DETAILED DESCRIPTION OF EMBODIMENTS OF THE INVENTION

The invention relates to a method for the manufacture of a molded colored contact lens containing a transparent central visual session and a colored image on at least a part of the remaining surface. A color image may be a cosmetic pattern, for example, iris-like patterns, fashion patterns (e.g. Wild Eye™), made-to-order (MTO) patterns, prosthetic patterns and the like; an inversion mark that allows a user to handle and insert easily a contact lens; a toric rotation mark, or contact lenses stock keeping units (SKUs), for example, either in forms of numbers or as bar codes. A color image may be a single color image or a multi-color image.

Figure 1:
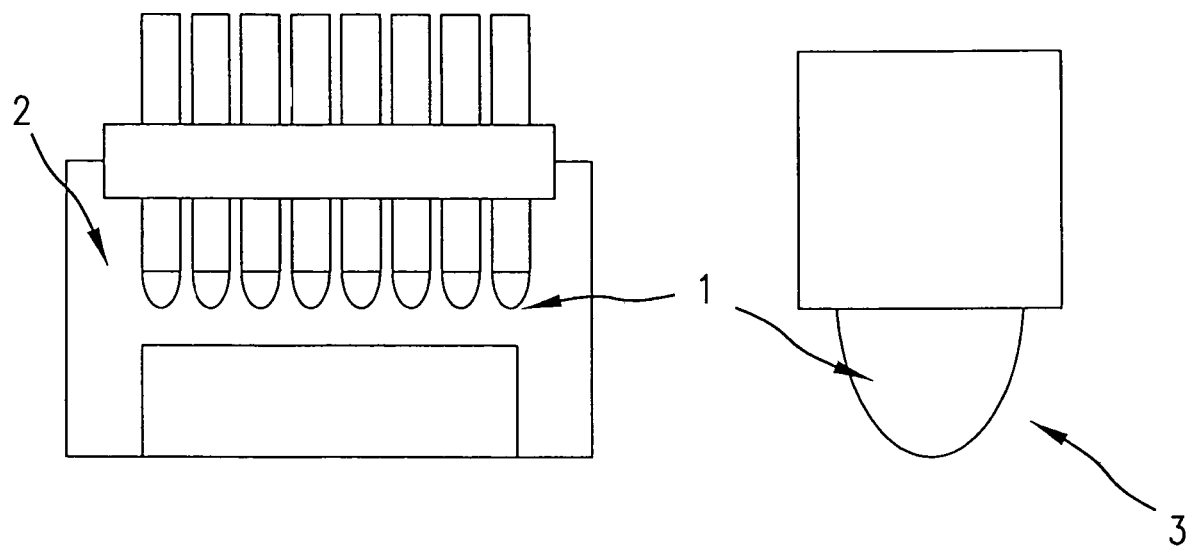
FIG. 1 schematically illustrates two embodiments of the present invention.

The present invention is better illustrated by the following embodiments. According to one embodiment at least one cliché is first inked with a water based ink by an ink supply means according to any known inking method and the excess ink leveled out with an appropriate doctoring blade. At least one transfer pad (1), preferably a set of pads together pick the ink from the cliché and transfer it to at least a surface of at least a contact lens forming mold. While the ink is hanging on the pad/s after having been picked from cliché and before having been deposited on the mold ("pick-up to drop off time") a blanket or a skirt (2) of humid air is created in the immediate vicinities of the pad/s or in alternative directional humidified air (3) is blown on the pad/s (1) to prevent the drying of the ink as illustrated in FIG. 1. In addition humid air could be blown also on the inked cliché and/or on the inked mold surface.

The humid air could either be directional or diffuse, depending upon the configuration of a pad transfer printer to be used. A typical air flow is between 700 and 950 ml/minute. However the air flow may be adjusted and optimized according to the apparatus used. The relative air humidity should be high enough to prevent the drying of the ink but it may not interfere with the contact lens formation. Preferably the relative humidity of the air is between 50 and 100%, more preferably is between 60% and 90% and even more preferably is between 75 and 80% at standard pressure and temperature wherein by standard temperature is meant a range from 15 to 30 degrees Celsius, preferably from 23 to 28 degrees Celsius.

The humidified air can be created either by using humidifying means such as a laboratory bubbler, or any industrial humidifier designed to connect to a duct or directly into the air surrounding the printer. For example a Mobile Environmental Control System from JS Humidifiers plc may be used to provide temperature and humidity controlled air. In a preferred embodiment JetSpray™ humidifiers also from JS Humidifiers plc may be employed. JetSpray™ humidifiers are easy to handle and have low maintenance cost. Within the humidifier compressed air is atomised to produce fine sprays that rapidly evaporate to raise the humidity directly in the air or in air handling units to the desired level. A JetSpray™ humidifier comprises a suitable number of atomising nozzles mounted onto one or more custom-designed manifolds, installed across the airflow. Moisture distribution is assured by the choice of nozzle capacity, suitable spacing on the manifold, correct positioning and flexible orientation of the nozzles. In even a more preferred embodiment a laminar flow of humid air is created in the proximity of the pad/s cliché and molds while printing.

After applying the ink on at least a molding surface of at least a mold, the printed ink may be at least partially pre-cured by means of an appropriate curing means either thermally or preferably by UV or other actinic radiation such as ionized radiation (e.g. gamma ray or X-ray irradiation), microwave irradiation, and the like, to form a colored film in accordance with the invention. Curing means may be common lamps preferably with one or most preferably with several optical fiber probes, in such a way that one lamp provide even illumination for several molds at the same time. Preferably the lamp is a UV mercury lamp, especially a doped medium pressure mercury lamp, whereby a medium pressure lamp HPA 2020 from Philips or a comparable medium pressure lamp from the company Heraeus may be used for example. In alternative a Hamamatsu lamp or Dr Groebel lamp may be employed alone or in combination with appropriate cut filters and/or condensers.

The optical fiber probes conveniently have a length of 0.3 to 6 m and are advantageously formed as liquid optical fibers, since these are particularly well suited to the transmission of UV light. Preferably pre-curing times range from 0.1 to 10 seconds preferably from 0.5 to 5 seconds and more preferably from 1 to 2 seconds.

Following pre-curing, a hydrogel lens-forming material is dispensed into a lens forming cavity of the printed mold preferably by using an automatic dispenser.

The contact lens may then be formed by spin casting as described in U.S. Pat. No. 5,034,166 or preferably by cast molding. For cast molding, a mold generally comprises at least two mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

The printed mold surface or mold half is allowed to sit for 10 seconds, preferably 5 seconds before mating then with corresponding other mold half and closing molds by using a pneumatic closing system. Therein the lens forming material is actinically or thermally cured whereby the colored film detaches from the molding surface and becomes integral with the body of the contact lens.

According to a preferred embodiment a printing unit comprises at least a cliché, at least a set of transfer pads, optionally at least a water based ink supply means, at least a humidification means and at least a curing means. In this case the contact lens forming mold/s has/have to be placed in the printing unit just before or during or just after the ink has been picked from the cliché by the transfer pads. The mold/s is/are removed from the printing unit only after the pre-curing of the ink printed on the lens forming mold/s. Outside the printing unit the lens forming mold/s is/are filled with a hydrogel lens-forming material. The hydrogel lens-forming material is then actinically or thermally cured whereby the colored film detaches from the molding surface and becomes integral with the body of the contact lens.

According to this embodiment the air humidification and air temperature is carefully controlled within the printing unit. The humid air may be blown on the pad/s every time the pad/s is/are inked or a constant relative humidity and temperature may be kept in the printing unit by means of a automitised laminar air flow wherein temperature and relative air humidity are constantly or periodically measured and adjusted to the proper value.

According to an even more preferred embodiment the printing unit is part of a partially or fully automated colored contact lens production line. By an appropriate transport subsystem in the production plant, at least one lens forming mold, preferably several at the same time are moved along a predetermined path into the printing unit wherein one mold at the time or several molds at the same time are printed thereupon according to the methods described here above. The lens forming mold/s may continuously be moving through the printing unit, however preferably the mold/s are stationary during at least one step of the printing process.

Preferably the mold/s is/are in stationary position for no longer than 30 seconds; more preferably for no longer than 10 seconds and most preferably for no longer than 5 seconds.

Any known suitable transfer pad printing structure may be used in the present invention.

Pad printing structures include, but are not limited to Tampo-type printing structures (Tampo vario 90/130), rubber stamps, thimbles, direct printing pads, or transfer print pads as they are known in the art. These print pads preferably comprise silicone or polyurethane. The elasticity of these polymers allows the inks to stick to the pad temporarily and fully release from the pad when it contacts a contact lens mold.

Clichés used in the present invention may be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliché according to any methods known to a person skilled in the art, for example, by chemical etching or laser ablation or the like.

The clichés may be cleaned after use, such as soaking in an appropriate solvent, sonication, or mechanical abrasion. A cleaning is particularly preferred in case of shallower clichés selected (20 μm depth), where ink buildup might cause a more rapid degradation of the pattern.

A contact lens forming mold to be used in the present invention generally comprises at least two mold halves, i.e. first and second mold half. The first mold half defines a first optical surface and the second mold half defines a second optical surface. The first and second mold halves are configured to receive each other such that a lens forming cavity is formed there in between the first molding surface and the second molding surface. The molding surface of a mold half is the cavity-forming surface of the mold and in direct contact with lens-forming material.

Lens forming molds may be made by all materials known in the art for making molds. Example are polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or quartz, glasses or sapphire. The molds may be one-way or reusable molds. Reusable molds following the production of a lens, may be cleaned rapidly and effectively from the uncrosslinked prepolymer and other residues, using water or a suitable solvent, and can be dried with air.

In a preferred embodiment, where a lens-forming material is a solution, solvent-free liquid, or melt of one or more prepolymers optionally in presence of other components, reusable molds are used and the lens-forming material is cured actinically under a spatial limitation of actinic radiation to form a colored contact lens. In this case, the lens-forming material is put into a mold consisting of two mold halves, the two mold halves preferably not touching each other but having a thin gap of annular design arranged between them. The gap is connected to the mold cavity, so that excess lens material can flow away into the gap.

The two opposite surfaces (anterior surface and posterior surface) of a contact lens are defined by the two optical surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation.

A water based ink to be used in combination with this invention is an ink in which the solvent is water. The ink may also (but preferably does not) comprise an organic solvent in addition to water. The water based ink comprises at least one colorant or pigment. The choice of pigments is not critical. The pigments may be any coloring substance or combination thereof that provides a desired color.

The water based ink preferably further comprises a water-soluble binder polymer having ethylenically unsaturated groups. Preferably the binding polymer is a water-soluble, actinically crosslinkable prepolymer selected from the group consisting of: a water-soluble crosslinkable poly(vinyl alcohol) prepolymer; a water-soluble vinyl group-terminated polyurethane; derivatives of a polyvinyl alcohol, polyethyleneimine or polyvinylamine; a water-soluble crosslinkable polyurea prepolymer; crosslinkable polyacrylamide; crosslinkable statistical copolymers of vinyl lactam, methyl methacrylate and a comonomer; crosslinkable copolymers of vinyl lactam, vinyl acetate and vinyl alcohol; polyether-polyester copolymers with crosslinkable side chains; branched polyalkylene glycol-urethane prepolymers; polyalkylene glycol-tetra(meth)acrylate prepolymers; crosslinkable polyallylamine gluconolactone prepolymers, and mixtures thereof. Even more preferably the water-soluble, actinically crosslinkable prepolymer is one of the polymerizable components of the lens-forming material.

More preferably the water based ink further comprises an initiator, preferably a photoinitiator, in an amount sufficient to provide the ink a cure time being about 50% or less, preferably 40% or less, more preferably 25% or less, even more preferably 15% or less, of initial cure time. Any suitable photoinitiators can be used in the ink formulations. The photoinitiator presently preferred by the inventors is Irgacure 2959, Irgacure 907, Irgacure 500, Irgacure 651, Irgacure 369, Darocure 1173, or Darocure 4265.

Most preferably the water based ink further comprises a surfactant. Examples of preferred surfactants are acetylenic diol-based surfactants such as Surfynol® 420 surfactant (ethoxylated acetylenic diols). The concentration of Surfynol® 420 surfactant in an ink of the invention is preferably from about 0.03% to about 0.16% by weight.

In a preferred embodiment, an ink to be used in combination with the present invention comprises: water in an amount of from about 30% to 98% by weight, preferably from about 50% to 93% by weight; a water-soluble and actinically-curable binder polymer in an amount of from about 2% to 40% by weight, preferably about 6% to 30%; and at least a colorant in an amount of from about 0.5% to 30% by weight, preferably about 1.5% to 20%; a rapid diffusive surfactant (preferably an acetylenic diol-based surfactant, more preferably Surfynol® 420 surfactant) in an amount of from about 0.03% to about 0.20% by weight; and a photoinitiator in an amount of from about 0.4% to about 2.4% by weight, more preferably from about 0.55% to about 2.1% by weight, even more preferably from about 0.7% to about 1.5% by weight.

The water based ink has preferably a viscosity of greater than about 100 centipoise (cps), more preferably above 200 cps, even more preferably above 350 cps. The viscosity of an ink solution can be as high as about 5,000 centipoise (cps), but is preferably between about 900 to about 3500 cps.

Any lens-forming materials known in the art may be used in the invention. Preferred lens-forming materials are capable of forming hydrogels. A lens-forming material may be made up of vinylic monomers like HEMA (hydroxyethylmethacrylate) or may comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention. While the selection of a lens-forming material is largely determined upon the final modality of use of the final contact lens, the presently preferred lens material is a modified polyvinyl alcohol prepolymer as disclosed in EP-A-641806, for example nelfilcon (Ciba Vision Corp). Nelfilcon is particularly preferred because it is water soluble and finished lens of optical quality can be produced from it within a few seconds, without the necessity for subsequent extraction or finishing steps.

The "front or anterior surface" of a contact lens, as used herein, refers to the surface of the lens that faces away from the eye during wear and it is typically substantially convex. The "rear or posterior surface" of a contact lens, as used herein, refers to the surface of the lens that faces towards the eye during wear and it is typically substantially concave.

While, either the front or rear surface of the contact lens or both may be printed, it is preferable to apply the ink to the front surface of the lens. However, there are special cosmetic effects achievable by providing a pattern on both the anterior and posterior surfaces. For instance, a colored pattern of one color can be applied to the back surface of the lens or the corresponding mold-half (for instance, white) and the same or different colored pattern can be applied to the front surface of the lens or the corresponding mold-half (for instance, dark blue). This then would result in a lens that could have either a multi-color textured appearance for extremely lifelike appearance, or a brighter tint using a white background to reflect back out at the observer.

If the ink is applied to both sides of a lens by printing up both sides of the mold, a pattern is affixed to both the back surface and the front surface molds as aforedescribed. Part of the lens-forming monomer mixture is supplied to each of the mold halves and each is partially polymerized thus fixing the patterns to the front and back surfaces of the lens. The two mold halves are combined, and the combination is interpolymerized to complete the cure and the formation of the lens with the patterns on both surfaces.

In addition the lens forming material may comprise small amount of a pigment to impart a uniform transparent, colored tint to the whole lens.

A contact lens can be clear before it is printed upon. Alternatively, a contact lens can be tinted prior to being printed upon. That is, a colorant may have been added to that lens using methods that are well known in the art before that lens is printed upon using the printing method of the invention.

The production of a colored contact lens according to the described method allows a prolonged "pick-up to drop off time" of the ink on the pad/s and give rise to improved image quality.

Figure 2:
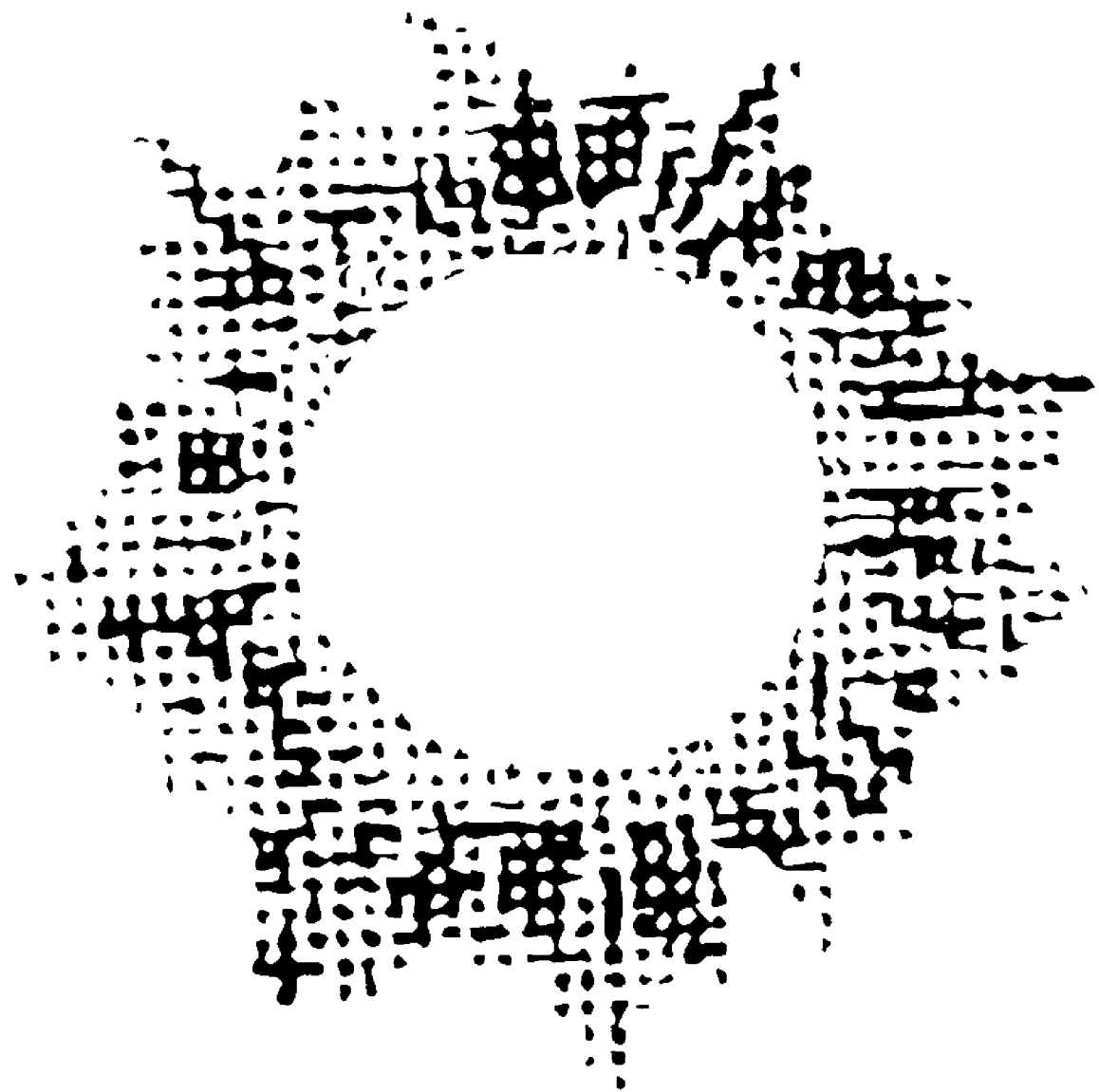
FIG. 2 shows a pattern to be printed on a contact lens.
Figure 3A:
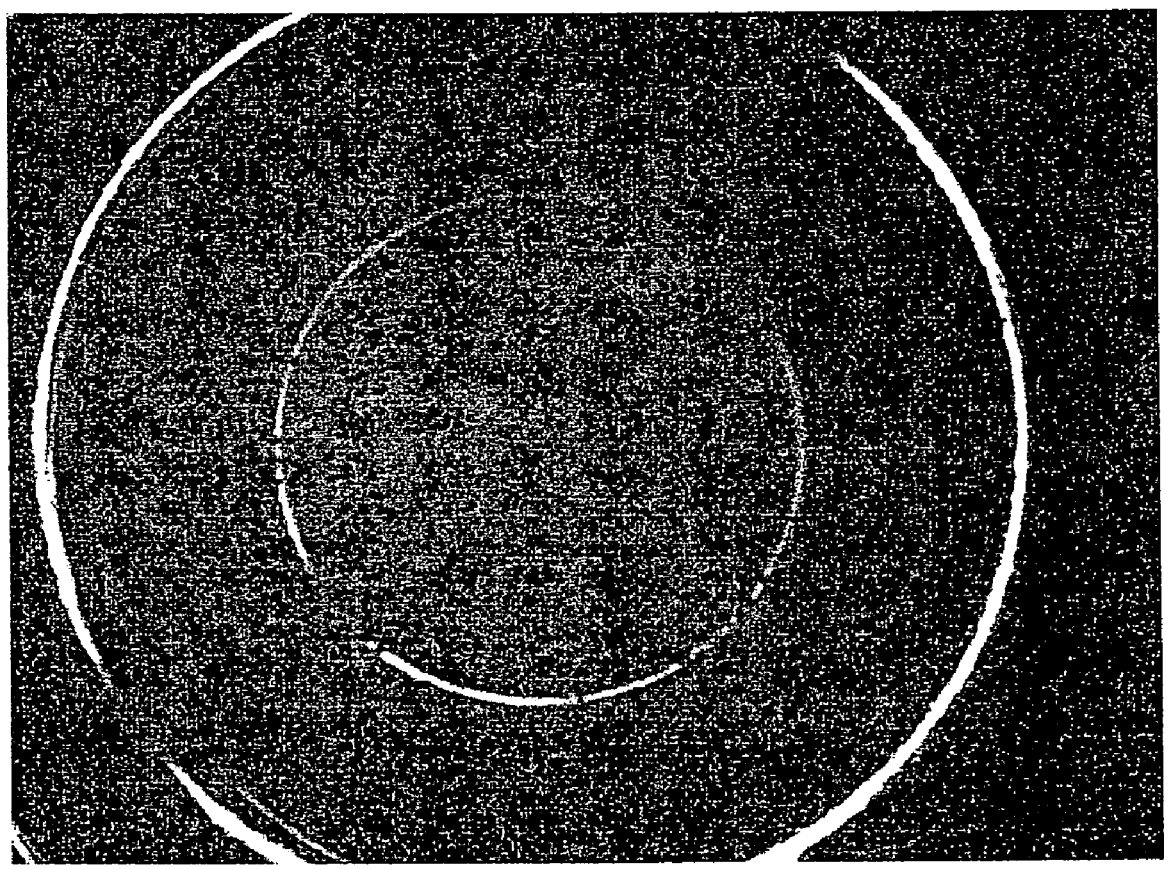
FIG. 3a shows a contact lens whereupon the pattern of FIG. 1 has been printed, air humidity during ink transfer was 0% and ink "pick-up to drop off time" 15 seconds.

For example, FIG. 2 shows a pattern to be printed on a contact lens; FIG. 3a shows a contact lens whereupon the pattern of FIG. 2 has been printed, relative air humidity during ink transfer was 0% and "pick-up to drop off time" of the ink on the pads was 15 seconds.

Figure 3B:
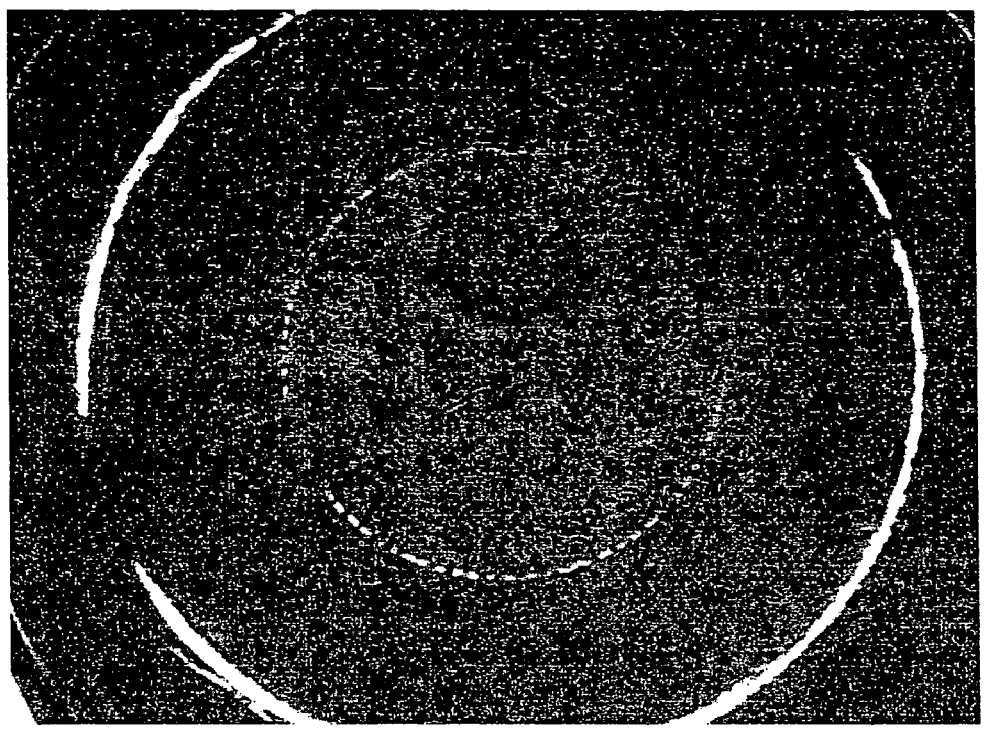
FIG. 3b shows a contact lens whereupon the pattern of FIG. 1 has been printed, air humidity during ink transfer was 100% and ink "pick-up to drop off time" 15 seconds.
Figure 4:
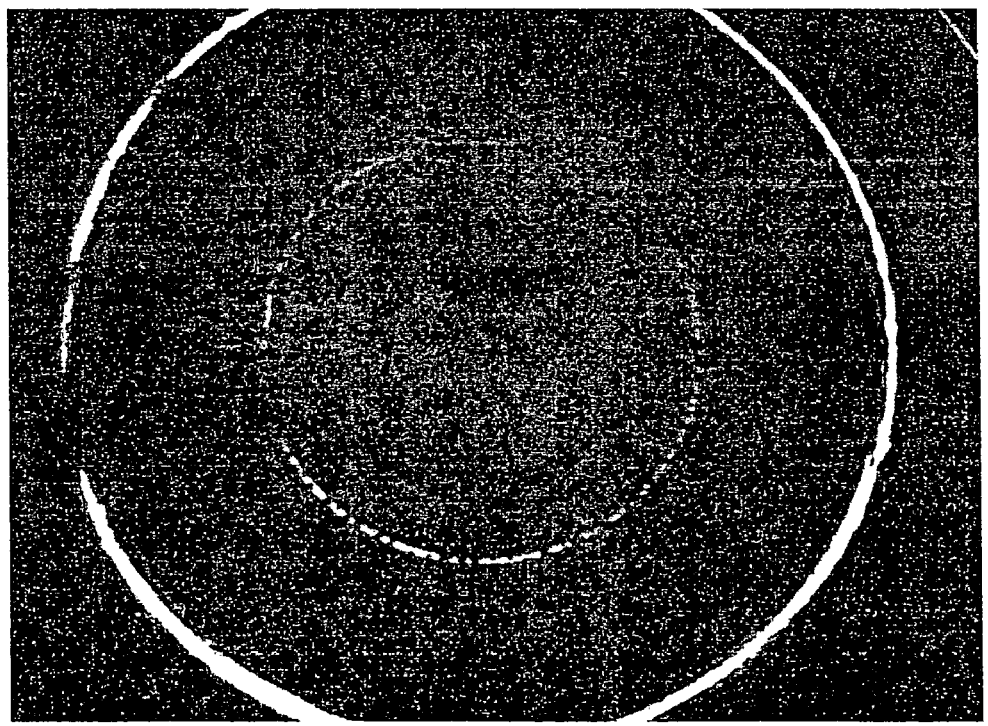
FIG. 4 shows a contact lens whereupon the pattern of FIG. 1 has been printed, air humidity during ink transfer was 100% and ink "pick-up to drop off time" 30 seconds.

For the same "pick-up to drop off time" a contact lens whereupon the pattern of FIG. 1 has been printed and relative air humidity during ink transfer was 100% is shown in FIG. 3b. It can be clearly observed that the amount of ink transferred is dependent on the relative air humidity for a given "pick-up to drop off time". FIG. 4 shows a contact lens whereupon the pattern of FIG. 2 has been printed. The high relative air humidity during ink transferring (100%) allows to obtain a good image quality even for a "pick-up to drop off time" of 30 seconds.

Preferred ink "pick-up to drop off time" ranges between 0.5 to 10 seconds, more preferably between 2 and 5 seconds.

Most preferably the colored image generated according to the present invention on the contact lens shall pass a sterilization-surviving test and at least a finger rubbing test to prove the ink adherence and to give a first indication of the mechanical stability of the lenses. The finger rubbing test is performed by removing the hydrated contact lens from a packaging solution, e.g., buffered saline, and digitally rubbing the lens between either two fingers or a finger and a palm for up to about 10 seconds. Visible and microscopic (~10×) observation of colorant bleeding, smearing, or delamination indicates failure of the rub test. Failure of the rub test gives also a first indication of poor mechanical properties of the lens.

"Passing a sterilization-surviving test" means that no significant decoloring or delamination or the like can be observed after a sterilization step such as autoclave, or irradiation with UV light, x-ray, or the like.

Preferably the lens shall also pass an adhesion test, which consist of rubbing the lens with cotton and determining the amount of color which sticks to it.

Surprisingly It has been observed that not only the adherence of the ink to lens is dependent on the air humidity. In fact, the mechanical properties of the lenses, especially the lens formed by a water-based monomer are dependent on the relative air humidity during printing and to the pre-curing and curing times and dosages. In particular higher relative air humidity gives rise to mechanically more stable lenses.

The following table illustrates these effects. Temperature was about 26 degrees Celsius and the lens forming material was nelfilcon.

| Test Nr. | UV - Dosis [mJ/cm2] Pre-curing1/ Pre-curing2/ Curing | Air Humidity | Rub Test Success rate | Adhesion test Success rate |
|---|---|---|---|---|
| 120904-5 | 20/14/30 | 73% | 73% | 100% |
| 120904-4 | 20/14/30 | 75% | 88% | 100% |
| 120904-2 | 20/14/30 | 77% | 96% | 100% |
| 160904-1 | 20/14/35 | 77% | 97.4% | 100% |
| 160904-3 | 20/20/30 | 77% | 91% | 100% |
| 160904-5 | 22/22/30 | 77% | 86.5% | 100% |

Even more preferably the colored contact lenses generated according to the present invention shall pass a mechanical test (e.g., modulus, maximum stress at break, maximum elongation at break, and toughness of contact lens materials). The following table illustrates this effect. Temperature was about 27 degrees Celsius and lens forming material was nelfilcon, UV dosage was kept constant.

| | Relative humidity: | Results: |
|---|---|---|
| 1574-68-2 | 62.5% | all lenses pass mechanical test no smearing |
| 1574-68-3 | 61.7% | all lenses pass mechanical test no smearing |
| 1574-69-1 | 47.6% | only 20% lenses pass mechanical test smearing seen |

The invention claimed is:

1. A transfer-printing method for making a colored hydrogel contact lens, comprising the steps of:

(a) inking, with a water-based ink, at least one cliché having an image to be printed on a contact lens to form an inked image in the cliché;

(b) transferring the inked image from the cliché to at least one surface of at least one contact lens forming mold by means of at least one transfer pad, wherein the relative air humidity in the immediate vicinities of the transfer pad is kept higher than 50% at temperature conditions within a range of from 15 to 30 degrees Celsius during ink transfer;

(c) at least partially curing the inked image transferred on the mold surface to form a colored film;

(d) dispensing a hydrogel lens-forming material into at least one lens-forming cavity of the mold; and (e) curing the lens-forming material within the lens-forming cavity to form the contact lens, whereby the colored film detaches from the molding surface and becomes integral with the body of the contact lens.

2. A method of claim 1, wherein the relative humidity is kept higher than 0.50% by blowing humid air on the inked pad by means of at least a humidifier.

3. A method of claims 2, wherein the humid air is blown on the inked cliché and on the inked mold.

4. A method of claim 1, wherein the mold comprises a first mold half and a second mold half and the water base ink is transferred on said first and/or said second mold half and the lens forming material is dispensed in the first or/and in the second mold half and the two molds halved are subsequently mated.

5. A method of claim 1, wherein the contact lens forming mold is transported into and placed in a printing unit just before, during, or after the ink has been picked from the cliché by the transfer pads, wherein the printing unit comprises the at least one cliché, the at least one transfer pad, and the at least one curing means, and wherein the contact lens forming mold is removed from the print unit after steps (a), (b), and (c) are performed within the print unit.

6. A method of claim 5, wherein the relative air humidity is constantly kept higher than 50% by means of a laminar air flow.

7. A method of claim 5, wherein the printing unit is a part of fully or partially automated colored contact lens production line wherein the mold/s travel/s on a transport subsystem.

8. A method of claim 7, wherein the transport subsystem alternates stationary position and movement within the printing unit.

9. A method of claim 8, wherein the molds are in one stationary position for no longer than 30 seconds.

10. A method of claim 8, wherein the transport subsystem is in a stationary position during step b.

11. A method of claim 1, wherein the water based ink has a viscosity of greater than about 100 centipoise (cps), and comprises at least one colorant, a water-soluble binder polymer having ethylenically unsaturated groups, an initiator, and a surfactant.

12. A method of claim 11, wherein the water-soluble binder polymer is nelfilcon.

13. A method of claim 1, wherein the lens forming material is nelfilcon.

14. A method of claim 1, wherein the relative air humidity is between 60 and 90%.

15. A method of claim 1, wherein the relative air humidity is between 75 and 80%.

16. A method of claim 2, wherein the relative air humidity is between 60 and 90%.

17. A method of claim 16, wherein the humid air is blown on the inked cliché and on the inked mold.

18. A method of claim 16, wherein the mold comprises a first mold half and a second mold half and the water base ink is transferred on said first and/or said second mold half and the lens forming material is dispensed in the first and/or in the second mold half and the two molds halved are subsequently mated.

19. A method of claim 5, wherein the relative air humidity is between 60 and 90%.

* * * * *